No. 830,005. PATENTED SEPT. 4, 1906.
L. E. RICE.
VULCANIZER.
APPLICATION FILED MAR. 8, 1906.
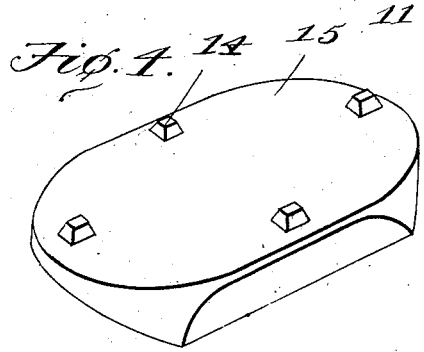
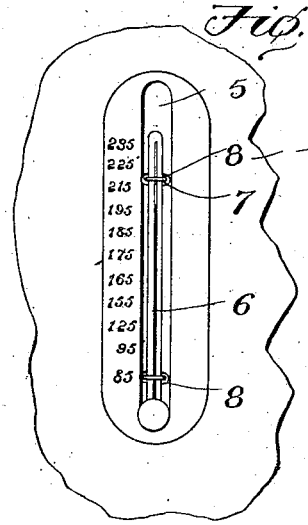
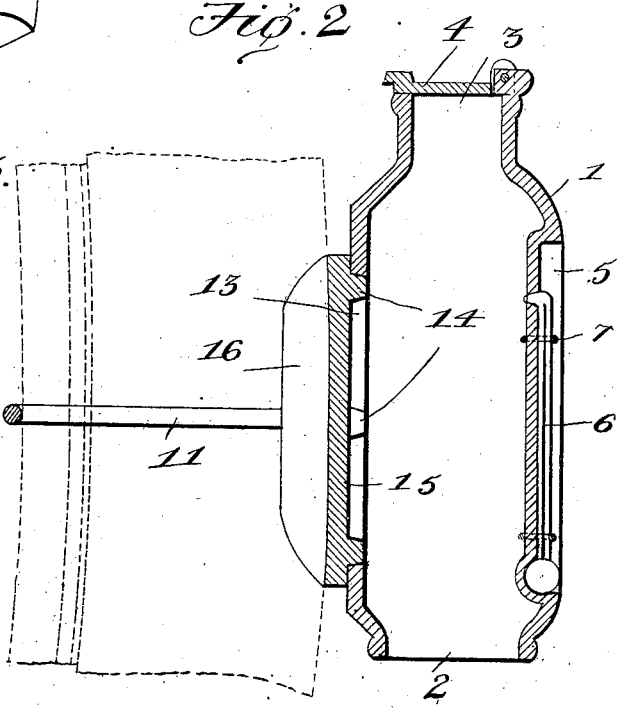
WITNESSES: Louis E. Rice, INVENTOR.
By C. A. Snow & Co.
ATTORNEYS

UNITED STATES PATENT OFFICE.

LOUIS EMORY RICE, OF CEDAR FALLS, IOWA.

VULCANIZER.

No. 830,005.  Specification of Letters Patent.  Patented Sept. 4, 1906.

Application filed March 8, 1906. Serial No. 304,985.

*To all whom it may concern:*

Be it known that I, LOUIS EMORY RICE, a citizen of the United States, residing at Cedar Falls, in the county of Black Hawk and State of Iowa, have invented a new and useful Vulcanizer, of which the following is a specification.

This invention relates to means for vulcanizing rubber; and it is particularly adapted for repairing tires, such as ordinarily used upon automobiles, bicycles, &c.

The object of the invention is to provide a simple and compact device of this character which may be readily secured to a wheel for the purpose of vulcanizing the tire thereon, said device having a detachable heating-iron mounted thereon and adapted to conform to the contour of tires of different sizes and shapes.

A still further object is to provide means for regulating the temperature within the vulcanizer and to indicate said temperature.

With the above and other objects in view the invention consists of a hollow body adapted to receive a suitable lamp for heating purposes, and this body has an outlet at one end provided with a damper, whereby the temperature within the body may be regulated. A large opening is formed in one face of the body and heating-irons are adapted to be detachably mounted therein. Means are provided for securing the vulcanizer to a wheel having a tire in position thereon.

The invention also consists of certain other novel features of construction and combinations of parts, which will be hereinafter more fully described, and pointed out in the claims.

In the accompanying drawings is shown the preferred form of the invention.

In said drawings, Figure 1 is a perspective view of the device. Fig. 2 is a section therethrough and showing in dotted lines a tire in position. Fig. 3 is an elevation of the recessed face of the body, and Fig. 4 is a perspective view of a heating-iron.

Referring to the figures by numerals of reference, 1 is a hollow body of any desired contour and having an opening 2 for the reception of a suitable heater. (Not shown.) An outlet 3 is also formed within the body, preferably opposite the opening 2, and this outlet is adapted to be closed by a damper 4, which may be hinged to the body or otherwise connected thereto. A groove 5 is formed in one face of the body and has a thermometer 6 secured therein, preferably by means of wires 7, which extend around the thermometer and are fastened within apertures 8, opening through the inner wall of the groove 5. Slotted ears 9 extend laterally from the body and are adapted to be engaged by the screwthreaded stems 10 of a bail 11. Clamping means, such as thumb-nuts 12, are mounted on the stems 10 of the bail.

A large opening 13 is formed in one face of the body 6 and preferably in that face thereof opposite to the one in which the thermometer is located. This opening is adapted to receive lugs 14, extending from the flat face of an iron 15, which is so shaped as to overlap the edges of the opening 3 and completely close the same when the iron is in position. The outer surface of the iron is concaved or otherwise shaped, as shown at 16, so as to fit snugly upon the surface to be vulcanized. A large number of these irons may be utilized, all of them having outer faces of different contours, so as to be used upon surfaces of different shapes.

In using this apparatus an iron 15 of the proper shape is placed with its lugs 14 within the opening 13, and said iron is then put in position over the surface to be vulcanized. Bail 11 is placed around the rim of the wheel, and the threaded stems thereof are seated in the slots within ears 9. By turning the nuts 12 upon the stems the iron 15 will be clamped tightly against the surface to be vulcanized, and all portions of the apparatus will be securely fastened in position. A suitable heater is then inserted into the opening 2 and the damper 4 is closed. The degree of heat generated within the body will be accurately indicated by the thermometer, and by opening or closing the damper this temperature can be regulated at will.

It will be seen that this vulcanizer can be very quickly applied to or removed from a wheel, and by having detachable irons the same is adapted for use in connection with all kinds of work and upon surfaces of various contours. As the irons fit snugly upon the surfaces to be vulcanized, much better results are obtained than where air-spaces are produced between the irons and the surfaces contacted by them.

What is claimed is—

1. In a vulcanizer the combination with a hollow body open at its ends and having an opening in one wall, the lower end opening being adapted to receive a heater; of an iron detachably mounted in the opening in the wall, and means hinged to the upper end of the body for closing the upper opening to confine heat within the body.

2. In a vulcanizer the combination with a hollow body having openings in its upper and lower ends, and a flat apertured face; of an iron adapted to detachably bear upon said face and entirely close the opening therein, means connected to the body for clamping said iron upon an object to be vulcanized, and a damper for closing the opening in the upper end of the body, the opening in the lower end adapted to receive a heater.

3. A vulcanizer comprising a hollow body open at its upper and lower ends, said body having a flat apertured face and having a longitudinal groove in one of its walls, the inner wall of said groove being apertured, an iron detachably resting upon the flat face of the body and completely closing the opening therein, means engaging the body for clamping said iron upon an object to be vulcanized, a thermometer disposed entirely within the groove, means within the apertures in the groove for securing the thermometer, and a damper for closing the upper end opening of the body, the lower end opening thereof being adapted to receive a heater.

In testimony that I claim the foregoing as my own I have hereto affixed my signature in the presence of two witnesses.

LOUIS EMORY RICE.

Witnesses:
  WM. C. NULM,
  J. H. BYERS.